June 18, 1963   R. D. FLYNN ETAL   3,094,607
FLUX LOADING OF STAINLESS STEEL WELDING STUDS
Filed June 21, 1960
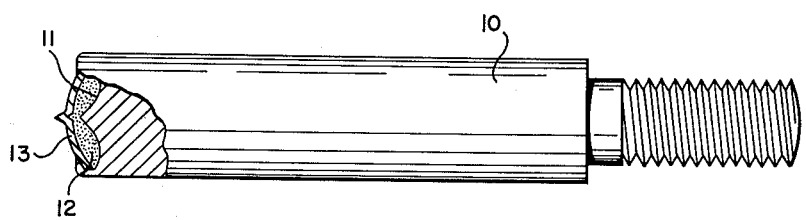
INVENTOR.
ROBERT D. FLYNN
BY ROBERT C. SINGLETON
Watts & Fisher
ATTORNEY 3,094,607
FLUX LOADING OF STAINLESS STEEL
WELDING STUDS
Robert D. Flynn, Elyria, and Robert C. Singleton, Oberlin, Ohio, assignors to Gregory Industries, Inc., Toledo, Ohio, a corporation of Michigan
Filed June 21, 1960, Ser. No. 37,665
14 Claims. (Cl. 219—99)

This invention relates to the art of stud welding by the drawn arc method, and relates more specifically to the method, means, and composition of fluxing matter employed to produce a sound and useful weld in austenitic stainless steel.

End welding of studs to steel plates is well known in the art. The techniques for such end welding vary considerably depending upon many factors including the size of the stud to be welded, the thickness of the plate to which the stud is to be welded, and power sources and type. It is well known in the art, and is standard practice, to use some type of fluxing material at the end of the stud to be welded to a plate. It is equally well known in the art that such fluxing material generally must include a quantity of material having a high affinity for oxygen, such as aluminum. The usual stud to be welded is a mild steel stud, and also the plate to which the stud is to be welded is mild steel. However, welding of stainless steel studs to mild steel plate, and even to stainless steel plate, has not been fully successful prior to this invention. Occasionally, such stainless steel weld appears good, but fails in service.

It was found that such failure could be reduced somewhat by using higher alloy type stainless steel such as 316 or 309 where, instead of using the typical 18–8 chromium-nickel alloy, a 25–20 or 20–12 or other similar high chromium-nickel alloy is used. The number designates percentages, indicating chromium first and nickel as the second number. Further, it was thought that inclusion of nickel and/or chromium in the conventional flux might solve the problem, and in fact nickel will produce a marked effect by reducing hardness, but it introduces problems of austenitic cracking, and consequently, reduced weld strength.

Investigation revealed that the brittleness in the weld metal deposit which resulted in slow failure was a result of the combination of the 18–8 stainless steel stud material and mild steel in the base plate. The resulting weld material deposit has an analysis of approximately 8% to 9% chromium and 4% to 5% nickel. This, of course, is a ferritic material and is subject to severe hardenability. If, as sometimes occurs, the base plate is medium carbon up to 0.30%, the resultant hardness in the weld metal deposit can be in the area of 40–45 Rockwell. Under these circumstances, the hardness leads to brittleness and minor imperfections in the weld metal deposit and may lead to failure when the part is subjected to sustained loading over a long period of time.

The higher alloy content of the 25–20 type stainless steel effectively reduced the hardness in the weld metal deposit and hence would seem to be a logical approach to the elimination of the problem. Unfortunately, the high cost of these extremely high alloy materials often rules out this approach from a practical point of view.

Therefore, the principal object of this invention is to produce sound welded studs of austenitic stainless steel of the least expensive type possible.

It is a further object of this invention to produce such sound welds in both stainless steel to stainless steel and stainless steel to mild steel.

A further object of this invention is to provide such sound weld with low alloy austenitic stainless steel studs welded to mild carbon steel.

A more particular object of this invention is to provide a flux material especially suited to weld 304, 308 and other austenitic stainless steel studs to mild steel plates, and particularly to mild steel plates having a carbon content in excess of 20%.

A more general object expressed in a different manner is to provide a flux material for stainless steel studs which when the stud is welded to a mild steel plate will produce a ductile, high-quality, imperfection free weld of equal or greater strength than the strength of the stud on the base plate.

In order to more fully depict and convey the advantages of the present invention, two conventional flux loads for studs were compared with the new and improved flux load in a series of tests. The first standard flux load was a "slug" of aluminum in the end of the stud. The second flux load was a mixture of flake iron and aluminum powder with a C–1010 steel cap. The chemistry of the flake iron is 3.22% C, 0.61% Mn, 0.125% S, 0.125% P, 3.29% Si, balance Fe. The aluminum powder used was standard commercial aluminum.

The new and improved flux was stainless steel powder with an aluminum cap. The chemistry of the stainless steel powder is as follows: 0.07% C, 1.2% Mn, 0.19% P, 0.009% S, 0.73% Si, 19.0% Cr, 9.7% Ni, balance Fe. This chemistry is within the range designated at 304 Stainless Steel, although other stainless steel alloys may be used effectively.

For clarity and convenience hereinafter, the aluminum slug load will be referred to as the slug load flux, the flake iron and aluminum powder will be referred to as the flake iron flux, and the stainless steel powder will be referred to as the stainless steel flux.

Other objects and a fuller understanding of the invention may be had by referring to the following description and claims taken in conjunction with the accompanying drawing, in which:

The single FIGURE is a side elevational view of a stud with parts broken away and removed to show the weldable end of the stud in cross section.

Studs having the different flux load were welded by standard techniques to mild steel plates and the welds obtained were compared. Included among these tests was the preparing of photo-micrographs under varied degrees of magnification of the weld structure obtained using the different flux loaded studs. These photomicrographs were prepared from sections cut through the stud and the plate to which the stud had been welded, and standard polishing and etching techniques were used.

As a convenient means to obtain a proper weld between the stainless steel stud and a mild steel plate, a standard stainless steel stud 10 is partially bored out to provide a cavity 11 at the end to be welded to the steel plate. The cavity formed is filled with stainless steel powder 12 and an aluminum cap 13 is placed on the end to hold the powder in the cavity. The preferred type of stainless steel powder is of the chemistry referred to above.

A comparison of photomicrographs will readily reveal that welds using the slug load flux and the flake iron flux have many micro-cracks and micro-fissures. Photomicrographs will also clearly show that when a stainless steel powder flux is used, there are few micro-cracks and -fissures, and those are quite small.

Note that reference throughout this disclosure has been made to a finely divided flux. It has been found that the finer sizes produce superior welds. In testing of this invention, the mesh size of the stainless steel flux ranged from minus 20 to plus 400. Size plus 300 represents about the practical economic limit of fineness, as well as the finest practical limit from the standpoint of handling to load the stud ends, but plus 400 has been used. The largest limit represents the largest practical size with respect to results obtainable. It has been established, however, that the use of a fine grade of stainless steel flux is the key to the superior results obtained.

By using finely divided stainless steel flux an unusually sound weld is obtained, whereas using the other conventional and known flux loads obtains a poor and often completely unsatisfactory weld.

It is not known exactly why the stainless steel so improves the characteristics of the weld, but it is believed that the alloys used in the stainless steel, especially nickel and chromium, promote a smoother and more even flow and mixing of the metals to be welded, as well as providing a composition that results in a tough, non-brittle weld. One consultant has expressed his opinion that the presence of a powdered material at the end of the stud may change the arc and melting characteristics of the weld to accomplish a smaller amount of more uniform melting of the stud and plate. This would produce the minimum amount of dilution between the two metals. Alloying of the carbon from the plate and chromium from the stud is probably the chief cause of cracking and brittleness.

This invention, therefore, is believed to be a new and novel solution to the stud welding art as applied to any stainless steel, particularly austenitic stainless steel, and also it is effective when welding stainless steel to stainless steel as well as stainless steel to mild steel, and the size of the flux has been determined to be an important new concept. The invention is applicable both for welding stainless steel studs to mild or stainless steel members and also for welding mild steel studs to stainless steel members.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The process of end welding a stud member to a construction member wherein one of the members is stainless steel and the other is steel comprising the steps of,
   (a) positioning one end of the stud member adjacent an area of the construction member wherein a weld is to be formed;
   (b) providing a flux in the weld area with the flux including finely divided stainless steel powder and an oxygen scavenging material;
   (c) melting a portion of the one end of the stud member and a portion of the construction member in said area by establishing an electric arc between the members; and,
   (d) forcing the portions together while melted and allowing the melted portions to cool to complete the weld.

2. The process of claim 1 wherein the flux is secured to said stud member first end and steps (a) and (b) are effected simultaneously.

3. The process of claim 1 wherein the flux is from minus 20 to plus 400 mesh.

4. The process of claim 1 wherein the oxygen scavenging material is aluminum.

5. The process of claim 2 wherein the oxygen scavenging material is aluminum.

6. The process of claim 1 wherein both members are stainless steel.

7. The process of claim 5 wherein both members are stainless steel.

8. The process of claim 1 wherein said other member is mild steel.

9. An end weldable stud combination comprising:
   (a) an elongated stainless steel stud member;
   (b) an aluminum cap member secured to one end of the steel member;
   (c) said members defining a cavity; and,
   (d) a finely divided stainless steel powder in the cavity.

10. The device of claim 9 wherein the flux is from minus 20 to plus 400 mesh.

11. An end weldable stud combination comprising:
    (a) an elongated steel stud means having a cavity adjacent one end thereof;
    (b) oxygen scavenging means carried by said stud means adjacent said one end;
    (c) a finely divided stainless steel power in said cavity; and
    (d) said means including parts retaining said power in the cavity.

12. The device of claim 11 wherein the stud means is austenitic stainless steel and 308 series.

13. The device of claim 11 wherein the oxygen scavenging means includes an aluminum cap secured to the stud means to close the cavity.

14. The device of claim 11 wherein the stud means is stainless steel and wherein the powder is from minus 20 to plus 400 mesh.

References Cited in the file of this patent

UNITED STATES PATENTS

| | | |
|---|---|---|
| 1,893,160 | Clark | Jan. 3, 1933 |
| 2,326,865 | Kennedy | Aug. 17, 1943 |
| 2,402,659 | Nelson | June 15, 1946 |
| 2,441,257 | Candy | May 11, 1948 |
| 2,455,244 | Evans | Nov. 30, 1948 |